M. BOISEN.
GAS GENERATOR.
APPLICATION FILED MAR. 19, 1921.

1,401,035.

Patented Dec. 20, 1921.

WITNESSES
Oliver W. Holmes
S. W. Foster

INVENTOR
MARTIN BOISEN
BY Munn & Co
ATTORNEYS

UNITED STATES PATENT OFFICE.

MARTIN BOISEN, OF SANDUSKY, OHIO.

GAS-GENERATOR.

1,401,035.

Specification of Letters Patent.  Patented Dec. 20, 1921.

Application filed March 19, 1921.  Serial No. 453,643.

*To all whom it may concern:*

Be it known that I, MARTIN BOISEN, a citizen of the United States, and a resident of Sandusky, in the county of Erie and State of Ohio, have invented a new and Improved Gas-Generator, of which the following is a full, clear, and exact description.

This invention relates to improvements in gas generators, an object of the invention being to provide an improved construction and arrangement of apparatus for electrically decomposing water to generate oxygen and hydrogen and direct these gases through separate outlets to any desired containers or point of use.

A further object is to improve upon the construction of generator disclosed in my copending application, Serial No. 394,168, filed July 6, 1920, for improvements in gas generators.

With these and other objects in view the invention consists in certain novel features of construction, and combinations and arrangements of parts as will be more fully hereinafter described and pointed out in the claims.

In the accompanying drawings—

Figure 1:
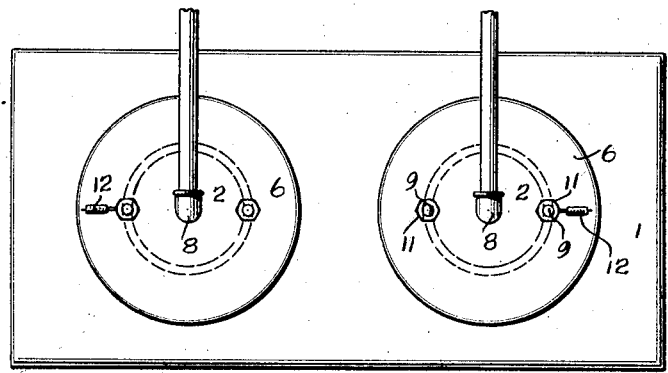
Figure 1 is a top plan view of my improved generator.
Figure 2:
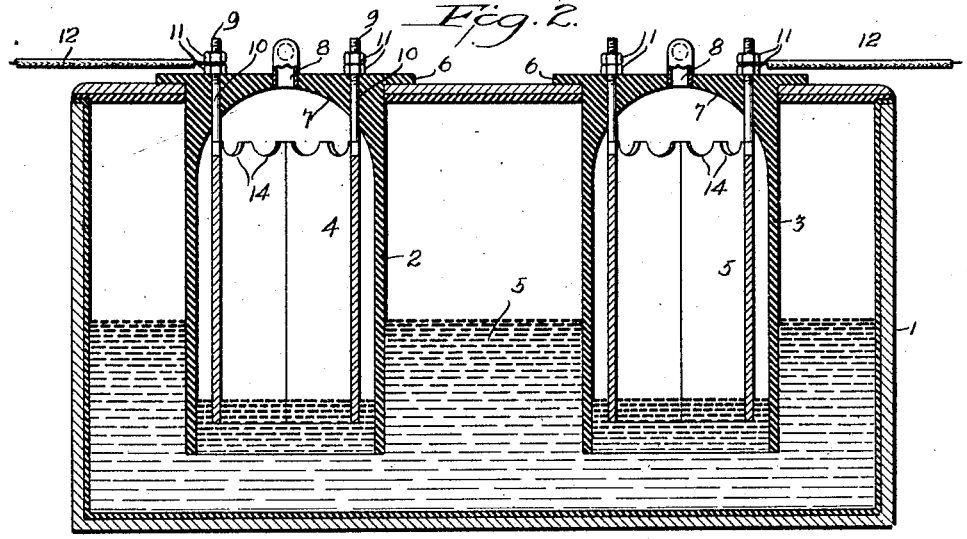
Fig. 2 is an enlarged view in longitudinal vertical section through the center of the generator.

1 represents my improved decomposing tank, in which I support a pair of cells 2 and 3 and locate electrodes 4 and 5 in the cells 2 and 3 respectively, the electrode 4 constituting an anode and the electrode 5 a cathode, or vice versa.

The cells 2 are of insulating material of general cylindrical form having open lower ends submerged in the water 5 in the tank. The upper ends of the cells 2 have annular flanges or other projections 6 resting on the upper face of the tank 1 and the connection between the cells and the tank is rendered gas tight in any approved manner.

While the upper outer surfaces of the cathode may or may not be flat as desired, the inner surfaces of the upper ends of the cells are concave or dome-shaped, as indicated at 7, so as to direct the gases in the cells into tubular outlets 8 located in the center of the upper ends at the highest points of the cells so that the gases will naturally flow into said outlets.

The electrodes 4 and 5 are hollow or tubular in form and may be cylindrical or other shape. These electrodes have each a pair of upwardly projecting binding posts 9, which project through openings 10 in the cells 2 and 3 and are provided with nuts 11 for securing electric wires 12 to the binding posts.

These binding posts are cemented or otherwise secured in the openings 10 to render the connection gastight, and it will be noted that they support the upper ends of the electrodes spaced from the top of the cells, and said upper ends are preferably recessed or corrugated, as shown at 14, to permit any gas which may accumulate in the cells and outside of the electrodes to flow freely into and through the outlets 8.

The lower ends of the electrodes are spaced above the lower ends of the cells so that when the gas pressure in the cells reaches a predetermined degree, the water in the lower ends of the cells will be forced downwardly below the lower ends of the electrodes to stop further generation of gas until the pressure is relieved, hence, the pressure of the gas generated is automatically maintained at the desired degree.

Figure 3:
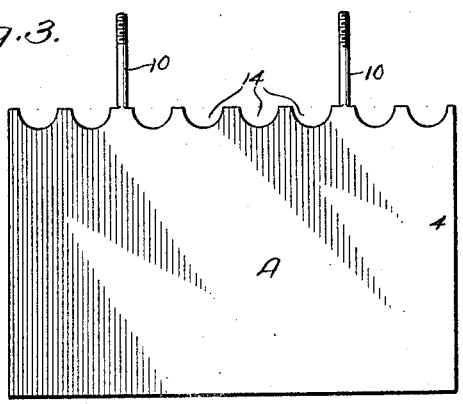
Fig. 3 is a plan view of a blank from which I form my improved electrodes.

The cells 3 are formed of any suitable insulating material and the electrodes 4 and 5 are preferably of sheet metal formed from a blank A, such as indicated in Fig. 3. This blank is made with the integral binding posts 9 or the latter may be fixed to the blank in any approved manner, and the blank is then curved or otherwise shaped to form a hollow or tubular electrode.

The electrode 4, constituting the anode, is preferably of nickel or other suitable material, upon which oxygen has little or no effect. The cathode 5 is preferably of aluminum or other suitable material, upon which hydrogen has little or no effect.

The ratio of the diameters of the electrodes with relation to the cells, would be governed by both the ratio of the conductivity of the substances used as electrodes and the ratio of the pressure of the gases on the water in the cells, thereby giving the same ratio of active surface exposed to the water at all times.

In using the term "tubular" or "hollow" electrode and cell, it is obvious that these terms are employed in their broadest sense to include any shape of cross-section.

I provide two binding posts 9 on each electrode not only because these binding posts constitute a firm support for the electrodes, but in the event that one of the binding posts is broken or injured, the other can be used, and it is, of course, to be understood that in most cases at least but a single binding post on each cathode will be in electric circuit with the source of electricity.

Various slight changes might be made in the general form and arrangement of the parts described without departing from the invention, and hence I do not limit myself to the precise details set forth, but consider myself at liberty to make such changes and alterations as fairly fall within the spirit and scope of the appended claims.

I claim:

1. A gas generator, comprising a tank adapted to contain water, tubular cells of insulating material suspended in the tank and having their lower ends submerged in the water of the tank and having outlets in their upper ends, and hollow electrodes supported in the cells, spaced from the walls of the cells and from the upper ends of the cells.

2. A gas generator, comprising a tank adapted to contain water, tubular cells of insulating material suspended in the tank and having their lower ends submerged in the water of the tank and having outlets in their upper ends, hollow electrodes supported in the cells and spaced from the walls of the cells and from the upper ends of the cells, and a pair of binding posts on opposite sides of each electrode projected through the upper ends of the cells and supporting the electrodes.

3. A gas generator, comprising a tank adapted to contain water, tubular cells of insulating material suspended in the tank and having their lower ends submerged in the water of the tank and having outlets in their upper ends, and hollow electrodes supported in the cells and spaced from the walls of the cells and from the upper ends of the cells, said cells having internally concave or dome-shaped upper ends with the outlets at the centers of the upper ends of the cells.

4. A gas generator, comprising a tank adapted to contain water, tubular cells of insulating material suspended in the tank and having their lower ends submerged in the water of the tank and having outlets in their upper ends, hollow electrodes supported in the cells and spaced from the walls of the cells and from the upper ends of the cells, said cells having internally concave or dome-shaped upper ends with the outlets at the centers of the upper ends of the cells, and said electrodes having serrated upper ends.

5. A gas generator, comprising a tank, cells in the tank, hollow electrode in the cells, said electrodes formed of sheet metal blanks bent into tubular form, and binding posts fixed to the upper ends of the electrodes and projected through openings in the upper ends of the cells, said cells having gas outlets in their upper ends.

MARTIN BOISEN.